Nov. 28, 1950 C. J. FITCH 2,531,876

RECORD CONTROLLED ACTUATING MECHANISM FOR EMBOSSING MACHINES

Filed Feb. 26, 1947 4 Sheets-Sheet 1

INVENTOR.
Clyde J. Fitch
BY
Edward R. Launder
AGENT

INVENTOR.
Clyde J. Fitch
BY Edward R. Lowndes
AGENT

Nov. 28, 1950

C. J. FITCH

RECORD CONTROLLED ACTUATING MECHANISM FOR EMBOSSING MACHINES 2,531,876

Filed Feb. 26, 1947

4 Sheets-Sheet 3

INVENTOR.
Clyde J. Fitch

BY

Edward R. Lowndes
AGENT

Nov. 28, 1950 C. J. FITCH 2,531,876

RECORD CONTROLLED ACTUATING MECHANISM FOR EMBOSSING MACHINES

Filed Feb. 26, 1947 4 Sheets-Sheet 4

INVENTOR.
Clyde J. Fitch

BY Edward R. Lowndes
AGENT

Patented Nov. 28, 1950

2,531,876

UNITED STATES PATENT OFFICE 2,531,876

RECORD CONTROLLED ACTUATING MECHANISM FOR EMBOSSING MACHINES

Clyde J. Fitch, Endicott, N. Y., assignor to International Business Machines Corporation, New York, N. Y., a corporation of New York Application February 26, 1947, Serial No. 731,078

7 Claims. (Cl. 197—20)

The present invention relates to record controlled actuating or translating mechanism which, under the control of a suitable perforated record medium, as for example, a strip of telegraphic type tape or a series of Hollerith type record cards, serves to operate the keyboard of an address plate-embossing machine.

Embossing machines of the type referred to above are generally termed reliefographs and were patented to W. E. Crane, May 11, 1897, Patent Nos. 582,177 and 582,178, and have variously been improved and patented to others, as for example, to R. Grieser, March 31, 1908, Patent No. 883,399. Reliefographs of this type are somewhat in the nature of typewriting machines wherein by the operation of a set of keys corresponding to various letters, numbers or other characters, such characters are embossed in relief upon a suitable printing surface or member.

In these reliefographs there usually are a pair of cylindrical members carrying the male and female dies. These members are rotated to bring the corresponding characters on each into register a short distance apart. The sheet metal is inserted between such positioned die members and thereupon one or both of such members are moved toward the other or each other, thus engaging the sheet metal between them to raise the desired character on the metal. The metal plate must be shifted after each impression in the manner of a typewriter carriage movement so that the impressions align to produce the desired writing. There must also be a line shift of the plate to produce the usual sucession of lines of writing. To facilitate a removable connection for the various address plates in a printing machine, the plates are removably hinged together and by this means any plate can be removed and another substituted or the two adjacent plates can be jointed together. A construction of this kind is illustrated in the patent to Grieser No. 866,928, dated September 4, 1907, and also in the patent to F. De Minico, No. 1,476,803, dated December 11, 1923.

The present specification deals principally with alterations to existing equipment in order to provide an automatic means for controlling the operations of an embossing machine to emboss the metal plates under the control of perforated record tape or cards. By means of this invention, the tape or cards may be punched at a central location for all address changes and new subscriptions to a printed publication. Where tape is employed as the record medium, it may be mailed or telegraphed to a remote point for use in printing machines and for this purpose a 5-line Teletype code is preferably employed, thus permitting standard Teletype perforating machines to be used in preparing the tape.

The provision of a record controlled actuating machine for in turn controlling the operation of an embossing machine being the principal object of the invention, it is another object to provide such a machine which, besides controlling the printing of characters by the embossing machine, also controls both the advance or indexing and the return movements of the plate-carrying carriage.

It is a further object of the invention to provide a novel means for returning the plate-carrying carriage to its initial or starting position after each line of type has been printed on the plate and which will perform such a function in an efficient manner so that the carriage is prevented from sudden abutment with the carriage limit stop, thereby protecting the same and the plates carried thereby from damage. This function is carried out regardless of whether the carriage has been advanced to the full extent of which it is capable or whether it has made only a partial advance.

A still further object of the invention is to provide a control mechanism of the character set forth above employing a series of permutation bars and cooperating character-embossing control levers, there being one permutation bar for each line or column of the particular code used, the mechanism also employing an additional or special permutation bar capable of being shifted and having slots formed therein capable of registry with slots formed in the other permutation bars to permit either numerical or alphabetic embossing functions to take place, each to the exclusion of the other.

In explanation of the last mentioned object above, this object is predicated upon the fact that whereas the keyboard of the embossing machine undergoing control is possessed of separate keys for alphabetic and numeric embossing operations, namely, twenty-six keys for alphabetic designations, exclusive of special characters such as ampersand, comma, etc., and ten keys for numeric designations, the 5-line Teletype code employed on the tape utilizes a limited number of code combinations and many of these represent dual characters, one an alphabetic and the other a numeric one. Utilizing conventional permutation methods, the occurrence of a dual function code combination at the tape-sensing station ordinarily would result in an attempt by the embossing machine to simultaneously emboss two characters, one alphabetic and the other numeric, upon the tape. In other words, the code bar actuating magnets employed in the conventional permutation system upon receiving such dual code combination impulses would effect a shifting of the code bars in such a manner as to institute mechanical functions which would result in depression of two keys at the keyboard of the embossing machine. According to the present invention, a special code combination is selected to represent an alphabetic-to-numeric shift of the special permutation bar and another code combination is selected to represent a numeric-to-alphabetic shift. This special permutation bar is so constructed as to become shifted to block off, so to speak, the numeric control levers when the numeric-to-alphabetic code combination is encountered and to block off the alphabetic control levers when the alphabetic-to-numeric code combination is encountered.

Yet another object of the invention is to provide an apparatus for controlling the operation of an embossing machine and which, in turn, operates under the control of a tape or card translating mechanism, together with a common motor drive for both the translating and the control mechanism.

A specific object of the invention is to provide a control machine of the character set forth above employing a reciprocable bail which is positively driven from a continuously rotatable motor shaft and which operates during its downward stroke to impinge upon a selected seeker lever which is projected from a series of such levers into the path of movement of the downwardly moving bail. Selection of the various levers is made possible by means of a series of magnetically controlled permutation bars that in turn respond to electric circuits which are established from the record medium. The seeker levers are operatively connected to a respective key of the embossing machine and when engaged by the bail become depressed to thus depress corresponding keys of the embossing machine to perform embossing operations according to the perforations provided in the controlling record medium.

The provision of a control apparatus of the character set forth above which is relatively simple in its construction, one which is rugged and durable and consequently is unlikely to get out of order, one which may be manufactured at a relatively low cost, and one which may be expected to efficiently perform the functions required of it are further desirable features that have been borne in mind in the production and development of the present invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a fragmentary perspective view of a record controlled actuating or translating mechanism for controlling the operation of a metal address plate embossing machine. This view shows the translating mechanism detached from the embossing machine and also shows the same operatively associated with a conventional tape reading unit by means of which the translating mechanism is in turn controlled.

Fig. 2 is a fragmentary side elevational view of a conventional embossing machine showing the movable carriage thereof, together with the operating connections existing between the latter and the present translating mechanism, including both the key depressing means and the means by which the plate retaining carriage is returned to its initial position preparatory to successive plate-embossing operations.

In all of the above described views like characters of reference are employed to designate like parts throughout.

Figures 1, 2:
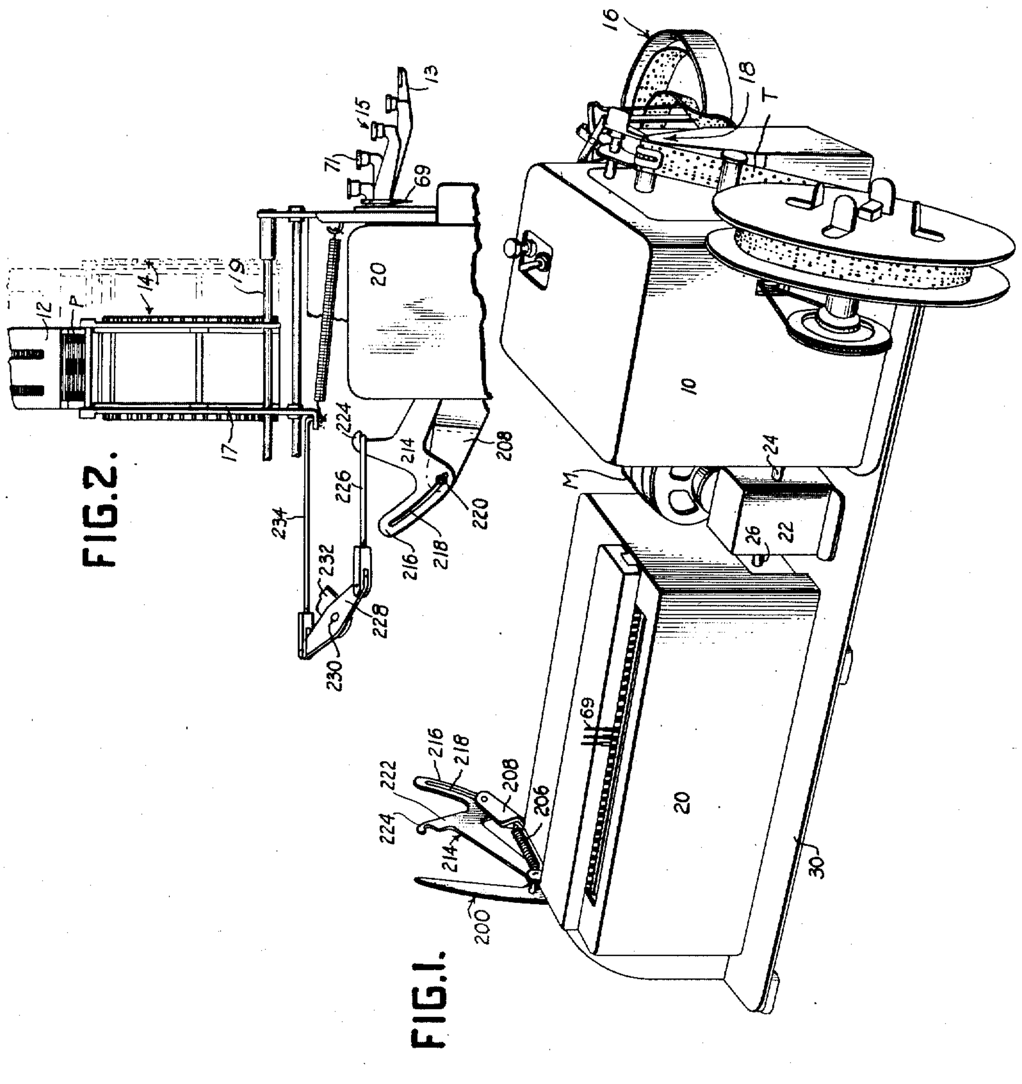

Referring now to the drawings in detail and particularly to Fig. 1, a tape reading unit of more or less conventional design is designated in its entirety at 10. The particular tape reading unit selected for purposes of illustration in connection with the present invention is of the type shown and described in a patent to Mills, No. 2,320,788, dated June 1, 1943, for a Telegraphic Tape Transmitter. This particular transmitter is designed to accommodate standard Teletype tape utilizing the conventional Teletype code. It will be understood, however, that other forms of transmitters may be employed whether these transmitters operate upon telegraphic tape, Hollerith type cards or other perforated record media. Irrespective of the particular nature of the transmitter employed, the essential features of the invention are at all times preserved. The tape reading unit 10 is adapted to receive a roll of tape T which has been prepunched with predetermined data, as for example, the names, addresses, and any other subscriber data which it is desired to emboss on a series of metal plates P contained in the hopper 12 of a plate-embossing machine which is designated in its entirety at 14.

The plate-embossing machine 14 which the present translating unit is designed to control is of the type shown in the above mentioned patent to Grieser, No. 883,399, and reference may be had to this patent for a full description of the operation thereof. It is deemed sufficient for the purpose of understanding the present invention to state that embossing operations take place under the control of a keyboard 15 including both alphabetic, numeric and special character keys. The carriage 17 of the machine 14 is slidably mounted upon guide rods 19 and is adapted to be advanced from the initial position shown in full lines in Fig. 2 to a final position shown in dotted lines. The carriage is advanced or indexed for character spacing operations much in the manner of a conventional typewriting machine carriage and is adapted to be returned to its full line position manually at the end of each line embossing operation. When operated manually the carriage is moved back to its starting position by means of a knob (not shown herein) provided on the carriage. For line feeding operations a lever 13 is provided.

As stated above, the tape reading unit 10 is of conventional design and thus reference may be had to the above mentioned patent for a full disclosure thereof. This unit is adapted to receive the tape T in a reel 16 from which it is withdrawn and progressively fed past a sensing station 18 wherein, by means of the use of sensing brushes and a contact roll (which appear diagrammatically in Fig. 12), certain electrical circuits are established and by means of which electrical impulses are applied to the control or translating unit 20 which comprises the present invention. These electrical impulses are applied to a series of electromagnets employed in connection with the present invention (and which will be described subsequently) to control the operation of the translating unit and to in turn control the operation of the embossing machine 14.

The tape reading unit 10 and also the translating unit 20 are both adapted to be driven from a common drive source in the form of an electric motor M which operates through a gear reduction device 22 to continuously rotate a drive shaft 24 leading to the tape reading unit 10 and a drive shaft 26 leading to the translating unit 20.

Referring now to Figs. 3 to 7 inclusive, the translating unit 20 involves in its general organization a base plate 30 from which there extends upwardly at opposite sides thereof a pair of side plates or members 32 and 34 and between the forward lower regions of which there extends the previously mentioned shaft 26, the latter being rotatably journaled in anti-friction bearings 36. On each of the stud shafts 42 and just inside the side plates 32 and 34 there is secured as at 38 a pair of bail cams 40, which are identical in design and in orientation, upon the shaft 26. A stub shaft 42 is mounted on each of the side plates 32 and 34 and these latter shafts serve to support thereon a pair of oscillatable or rockable bail supporting yoke members 44 having generally upstanding arms 46 across which there extends, and to the upper ends of which there is anchored as at 48, a seeker lever restoring bail 50. The yoke members 44 are also formed with generally forwardly extending arms 52 having anchored thereto as at 54 at their outer or free ends a seeker lever actuating bail 56. The forwardly extending arms 52 are each provided with studs 58 on which there are mounted respectively cam followers in the form of rollers 60.

From the above description it will be seen that inasmuch as the shaft 26 is continuously rotated under the influence of the motor M the rollers 60, riding upon the cams 40, serve to impart oscillation or rocking movement to the bail carrying yoke members 44, thus oscillating the restoring bail 50 and the actuating bail 56 continuously to and fro in an arcuate path. A pair of coil springs 61 are attached to lugs 63 formed on the arms 52 and are anchored to studs 65 carried by the side plates 32 and 34. These coil springs are of relatively heavy construction so that a very positive downward application of force is applied to the actuating bail 56 during each cycle of oscillation thereof.

Figures 5, 6, 7:
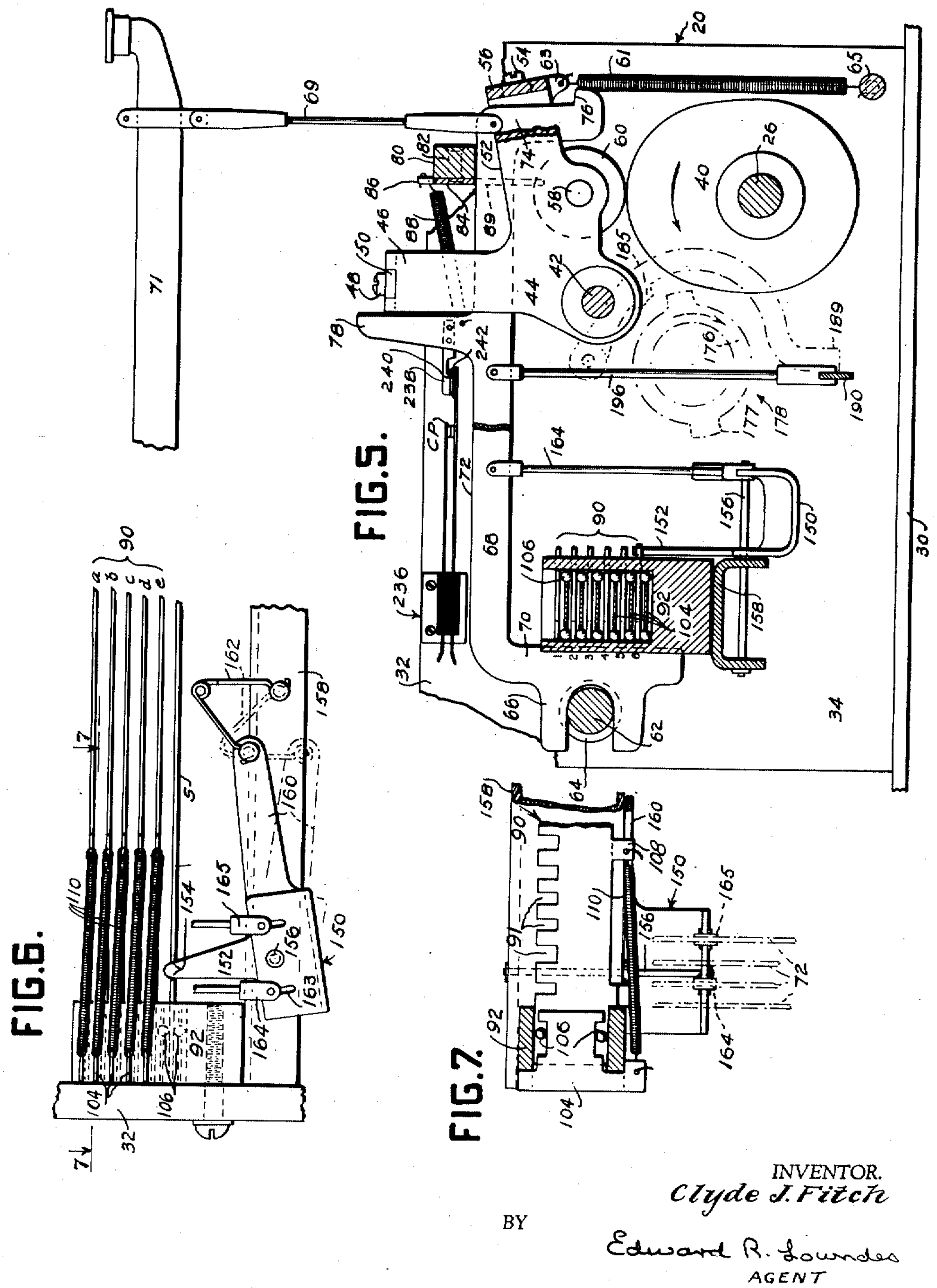
Fig. 5 is a sectional view taken substantially along the line 5—5 of Fig. 3.
Fig. 6 is an enlarged detailed fragmentary view showing an alphabetic-numeric change-over mechanism employed in connection with the present invention.
Fig. 7 is a sectional view taken substantially along the line 7—7 of Fig. 6.

Referring now particularly to Fig. 5, a supporting guide rod 62 extends across the machine between the side plates 32 and 34 and is provided with a series of spaced annular grooves 64 which are employed for guide purposes and each of which receives therein the opposite edges of a fork-like extension 66 formed on a seeker lever 68. Each seeker lever, of which there are in number one for each key of the keyboard 15 of the embossing machine 14, is formed of relatively thin sheet stock and is provided with a downwardly extending portion 70 on which the previously mentioned forked extension 66 is formed. Each lever 68 is also formed with a generally horizontally extending portion 72, the forward end of which is downwardly turned as at 74. Each downwardly extending portion 74 is formed with a forwardly extending shoulder 76 designed for cooperation with the actuating bail 56 in a manner that will be made clear presently. Each of the seeker levers 68 has secured thereto at its forward end a tie rod 69 (see also Fig. 2) which is connected to one of the keys 71 of the embossing machine 14.

Each seeker lever 68 is provided in its medial region with an upwardly extending finger 78 which extends above the general level of the restoring bail 50 and these fingers are designed for cooperation with the bail 50 for the purpose of returning the seeker levers to a retracted position, as also will be described presently.

A square shaft or rod 80 extends across the side plates 32 and 34 and has riveted or otherwise secured thereto as at 82 a comb-like member 84 which is substantially coextensive with the rod 80 and the upper edge of which has formed therealong a series of upstanding lugs 86 which serve as anchor points for the adjacent ends of a series of coil springs 88. The other ends of the springs 88 are each secured to a respective seeker lever 68 and thus all of the seeker levers are normally biased forwardly from the retracted position shown in Fig. 5 to an advanced position wherein the shoulder 76 thereof projects into the downward path of movement of the continuously oscillating actuating bail 56. The comb-like member 84 is provided with a series of downwardly extending fingers or teeth 89 affording therebetween guide spaces through which the forward ends of the seeker levers 68 extend in sliding relationship with respect thereto.

Still referring to Fig. 5, and in addition to Figs. 6 and 7, all of the seeker levers 68 are maintained in their retracted positions against the action of their biasing springs 88 by means of a series of six notched permutation bars, the entire group of which is generally designated at 90 with the individual bars being designated at *a*, *b*, *c*, *d*, *e* and *s* reading from top to bottom as viewed in Fig. 6.

The bars *a* to *e* inclusive are herein referred to as code bars, while the bar *s* is termed a shift bar, all of the bars being known as permutation bars. The permutation bars *a*, *b*, *c*, *d*, *e* and *s* operate in common to permit selective operation of the seeker levers 68 in a manner common to similar permutation systems.

As stated above, the particular code which has been selected for purposes of illustration in connection with this invention is the conventional Teletype code now widely in use. This code is a 5-line code and certain code combinations represent alphabetic designations alone, while other code combinations represent jointly alphabetic as well as numeric designations. For permutation purposes, therefore, the five permutation bars *a* through *e* inclusive are ample to accommodate the twenty-six characters of the alphabet, as well as to accommodate special characters such as the dash, hyphen, ampersand, etc. Because of the fact that the Teletype employs dual purpose characters, i. e., alphabetic and numeric, it is necessary in the present instance to employ a sixth permutation bar which is the shift bar *s*. The permutation bars *a* to *e* inclusive are provided with a series of notches, such as are shown at 91 (Fig. 7) which are designed for selective registry with one another to permit the seeker levers 68 to move forwardly under the influence of the springs 88 when, by the permutation system, selective shifting of the bars is resorted to. The shift bar *s* is likewise provided with a series of notches having intervening blocking edges to block the alphabetic seeker levers 68 when numeric embossing operations are being resorted to and to block the numeric seeker levers 68 when alphabetic embossing operations are resorted to. The permutation bars *a* to *e* and *s* extend across the machine in superimposed relationship as shown in Figs. 6 and 7, and have their opposite ends slidably mounted in anti-friction cage assemblies designated in their entirety at 92. Each assembly involves in its general organization a block or body portion 94 having upstanding side portions 96 (Fig. 8), the rear vertical edges of which are slotted as at 98 for reception therein of a pair of ears 105 and 105′ which are formed on a series of floating spacer strips 104, one of which is shown in detail in Fig. 9. The ear 105′ is somewhat elongated and is adapted to project completely through one of the slots 98, as shown in Fig. 7, to provide an attachment ear for one of a series of springs 110. Each of the springs 110 has its forward end anchored to an ear 108 provided on a respective permutation bar 90 and thus it will be seen that the permutation bars 90 are all normally urged in the left-hand direction, as viewed in Fig. 6, and in this retracted position the shoulders 76 of the seeker levers 68 are withdrawn from the downward path of movement of the actuating bail 56. The spacer strips 104 are formed with opposed shoulders 107 at the sides thereof for the purpose of retaining therebetween a series of ball bearings 106. These ball bearings are positioned above and below the opposite ends of the various permutation bars 90 and form anti-friction members for ease of movement of the latter.

From the above description it will be seen that the various magnet-controlled permutation bars 90 have their ends journaled in the block 94 by means of anti-friction bearings, thus making it extremely easy to move these permutation bars under the influence of a series of magnets which will now be described.

Figures 3, 4:
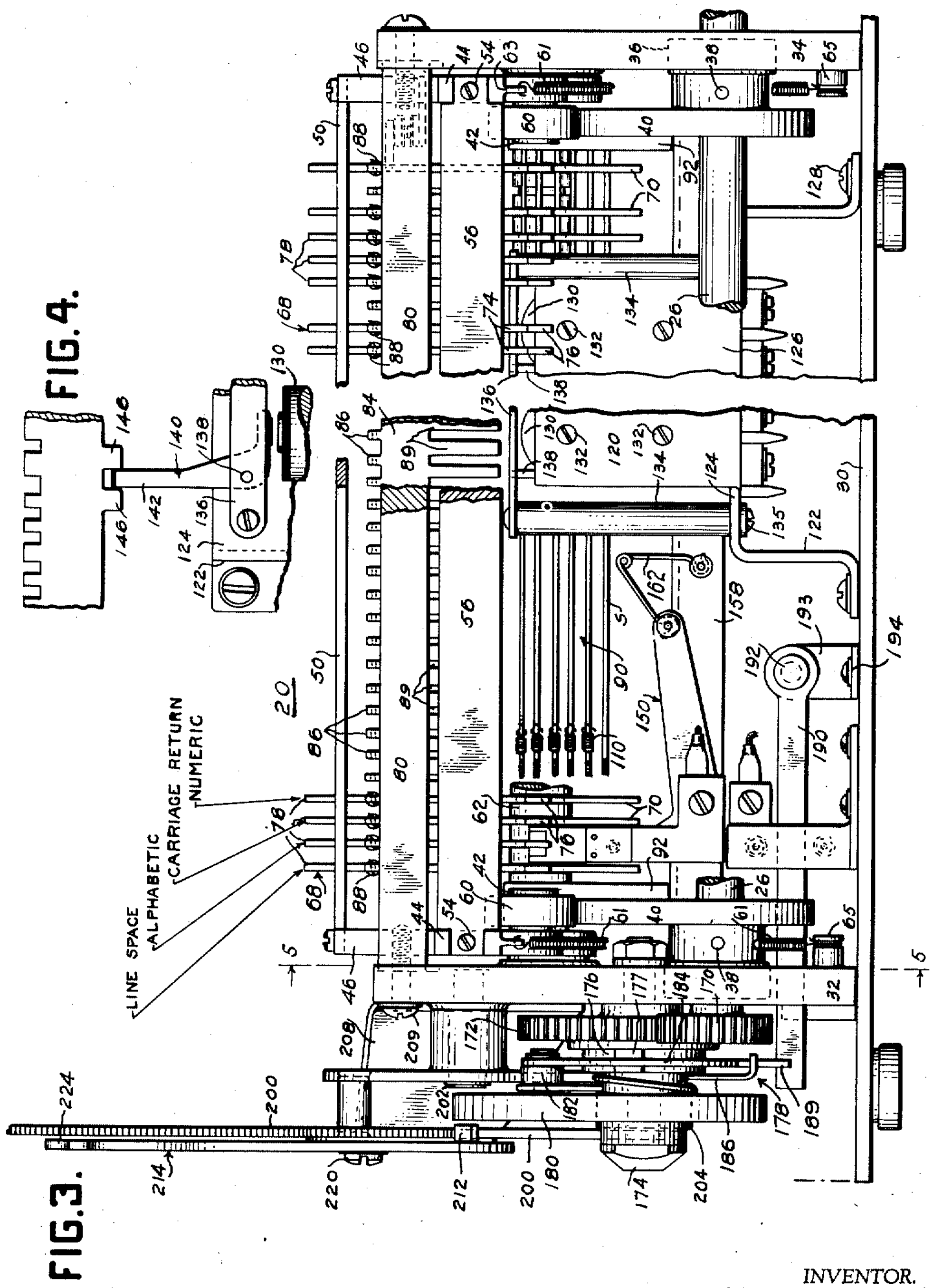
Fig. 3 is a front elevational view of the translating mechanism with its cover plate removed. In this view, certain parts have been broken away to more clearly reveal the nature of the invention.
Fig. 4 is an enlarged detailed fragmentary view of an electromagnetic permutation bar actuating means as employed in connection with the present invention.

Referring now to Figs. 3 and 4, a magnet supporting rack 120, including supporting legs 122, a table portion 124 and a vertical wall portion 126, is secured as at 128 to the base plate 30. The wall portion 126 serves to support a series of five magnets collectively designated at 130 and arranged at different elevations on the wall portion 126 and being secured thereto by means of screws 132. A pair of spacer sleeves 134 are mounted on vertical bolts 135 and have clamped thereto at their upper ends a cross bar 136. A series of vertical shafts 138 have pivotally mounted thereon respective armatures 140 for the various magnets 130. Each armature includes a rearwardly extending finger 142 which projects between a pair of lugs 146 mounted on the forward side of one of the code bars *a* to *e* inclusive, as shown in Fig. 4. It will be seen that upon energization of one or more of the magnets 130 under the influence of circuits leading from the tape reading unit 10 and occasioned by passage of the tape T between the contact brush and roll at the sensing station 18, the cooperating armature will be attracted and rocked in a clockwise direction, as viewed in Fig. 4, to shift its respective code bar *a, b, c, d* or *e*, as the case may be, to the right and effect registry of the various permutation notches 91 formed along the rear edge of the code bars. Upon deenergization of the magnet 130 its respective code bar will be restored to its initial position under the influence of one of the springs 110.

In order to selectively block the various slots formed in the code bars *a* to *e* inclusive to accommodate alphabetic or numeric embossing operations on the plates P, the shift bar *s* is adapted to be moved in opposite directions by means of a generally U-shaped toggle member 150 having an actuating finger 152 projecting upwardly therefrom and extending into a slot 154 formed in the shift bar *s*. The member 150 is pivotally mounted on a shaft 156 which in turn is supported from the sides of an inverted channel member 158 extending between the side plates 32 and 34. The side of the toggle member 150 adjacent the inverted channel member 158 is formed with a laterally projecting toggle arm 160 and this member is biased by means of a toggle spring 162 for either of two positions of rest, i. e., the full line position thereof or the dotted line position. In the full line position, the code bar *s* will be so positioned as to block the various seeker levers 68 from entering such registering permutation notches 91 as will pertain to numeric embossing operations. Similarly, in the dotted line position of the toggle member 150, the shift bar *s* will serve to block entry of the seeker levers 68 into such registering permutation notches 91 as pertains to alphabetic embossing operations. The side of the toggle member 150 remote from the channel member 158 is formed with a pair of generally vertically extending slots 163 by means of which a pair of tie rods 164 and 165, similar to the tie rods 69, are attached.

Referring now to Figs. 3 and 5, it will be seen that the upper ends of the tie rods 164 and 165 are attached to the medial regions of a pair of seeker levers in Fig. 3. The four left-hand seeker levers 68 are function levers, as distinguished from character-embossing levers and have been labeled Line Space, Alphabetic, Carriage Return and Numeric, reading from left to right. The line space seeker lever is attached by one of the tie rods 69 to the line space lever 13 of the embossing machine. The carriage return seeker lever is attached in a manner that will subsequently be described to a latch member for initiating carriage return operations whenever a carriage return code combination is presented by the tape at the sensing station. The alphabetic and numeric seeker levers are not attached to the keyboard of the embossing machine, but instead their selection by special code combinations in the perforated tape T results in a movement of the shift bar *s* to one or the other of two positions. It is to be noted at this point that while the shift bar *s* is so constructed as to selectively block entry of the seeker levers which pertains to alphabetic or numeric functions, this shift bar makes no provision for blocking entry of any seeker levers which are not concerned with embossing operations, as for example, the carriage return seeker lever or the two seeker levers which control shifting of the shift bar itself.

With the tie rod 164 secured to the seeker lever labeled Alphabetic, when this latter seeker lever is projected forwardly and the shoulder 76 engaged by the bail 56, depression of this lever will, through the tie rod 164, cause the toggle member 150 to be moved in a counterclockwise direction, as viewed in Fig. 6, thus preparing the apparatus for subsequent alphabetic embossing control operations. Similarly, when the seeker lever labeled Numeric is moved forwardly and engaged by the bail 56, depression thereof will operate through the tie rod 165 to move the toggle member 150 in a clockwise direction to prepare the apparatus for subsequent numeric embossing operations.

It is believed that from the above description of parts the operation of the translating apparatus 20, insofar as selection of the various character embossing keys and function keys 71 of the keyboard 15 for the purpose of depressing the same, will be obvious. However, to facilitate an understanding of the invention, it may be stated that due to the continuous rotation of the bail cam 40, rocking movement will be imparted to the yoke member 44, thus oscillating the actuating bail 56 so that the same will have an effective vertical component of motion and also oscillating the restoring bail 50 so that it will have an effective horizontal component of motion. Depending upon the position to which the various permutation bars 90 are positioned under the influence of the magnets 130, a selected seeker lever 68 will be permitted to move forwardly to its advanced position under the influence of its respective coil spring 88. If the selected lever 68 happens to be a character-embossing lever, depression of the same when the actuating bail 56 engages the shoulder 76 thereof will thus depress the character key 71 of the keyboard 15 to which it is attached by the tie rod 69. As the actuating bail 56 performs its upward stroke, the restoring bail 50 will perform its rearward stroke, thus bearing against the extension 78 of the lever 68 and restoring the lever to its normal position preparatory to the next cycle of operation. The same actuation of seeker levers 68 holds true whether these levers be character-embossing levers or function levers.

Figures 8, 9, 10, 11, 12:
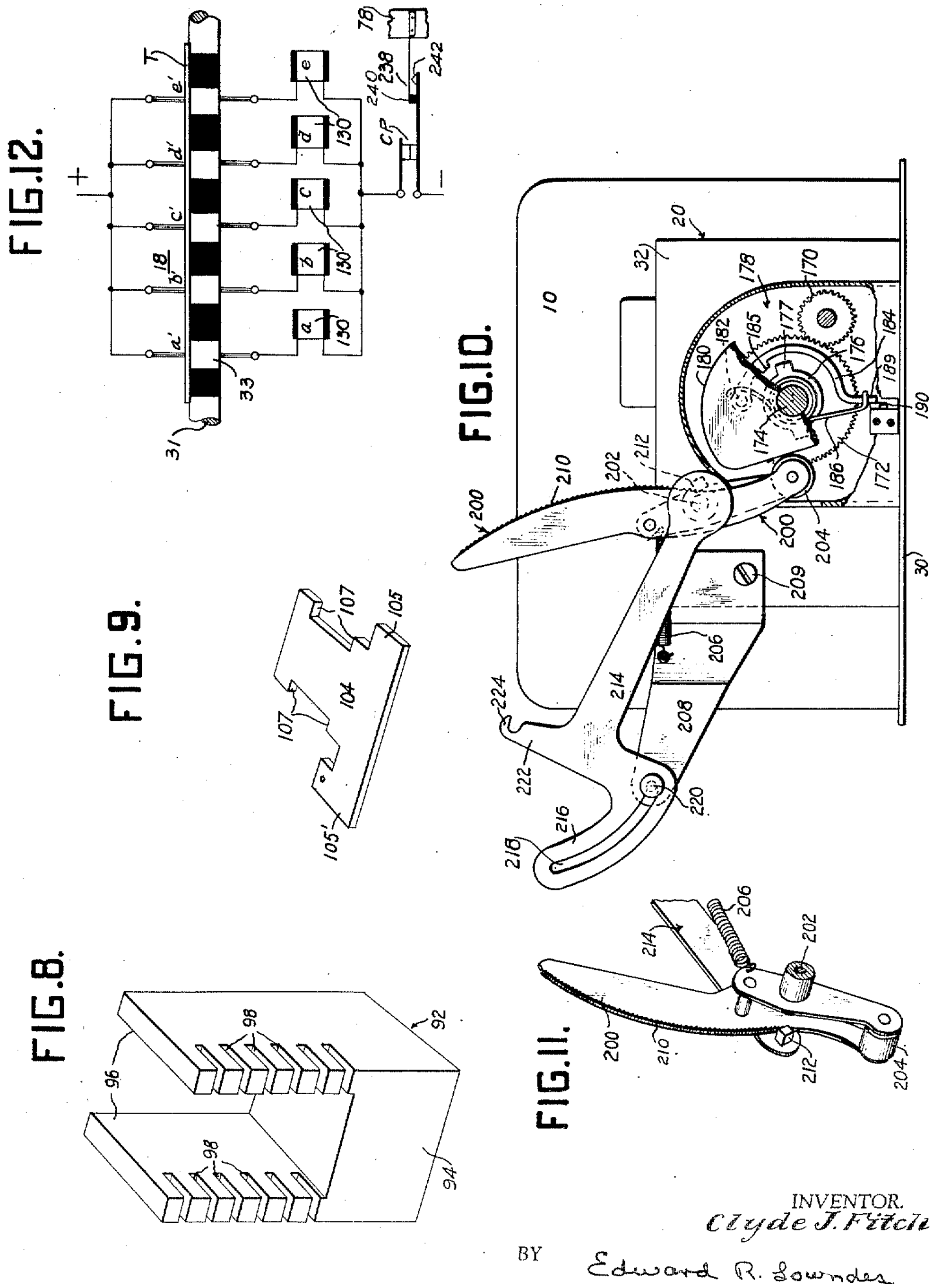
Fig. 8 is an enlarged detailed perspective view of an anti-friction block employed in connection with the present invention.
Fig. 9 is a perspective view of an anti-friction guide element employed in connection with the present invention.
Fig. 10 is an enlarged fragmentary side elevational view, partly in section, of a carriage return mechanism employed in connection with the invention, together with the clutch and cam actuating means therefor.
Fig. 11 is a fragmentary detailed perspective view of a portion of the mechanism shown in Fig. 8.
Fig. 12 is a circuit diagram for a plurality of permutation magnets employed in connection with the present invention.

Referring now to Figs. 3 and 10, the outer end of the shaft 26 just outside of the side plate 32 carries a pinion 170 which meshes with a larger pinion 172 mounted on a short shaft or stud 174 carried on the side plate 32. The pinion 172 has formed thereon one element 176 of a one-revolution clutch designated in its entirety at 178. The clutch element 176 has formed thereon a pair of diametrically opposed clutch teeth 177. The other element of the clutch 178 includes a carriage return cam 180 loosely disposed on the shaft 174 and having an inwardly extending pin 182 eccentrically disposed thereon. An arcuate clutch latching member 184 having a lateral tooth 185 associated therewith is pivotally secured to the pin 182 and is biased in a clockwise direction by means of a spring 186 surrounding the shaft 174. The teeth 177 formed on the member 176 are designed for cooperation with the tooth 185 in performing the operative clutching functions of the one-revolution clutch 178. The lower end of the arcuate member 184 is turned downwardly as at 189 and is adapted to bear against the side of an elongated latch bar 190 (Figs. 3, 5 and 10) which is pivoted as at 192 to a bracket 193, the latter being secured as at 194 to the base plate 30. The latch bar 190 is connected medially of its ends by means of a tie rod 196 to the seeker lever 68 which has been labeled Carriage Return in Fig. 3. The elongated latch member 190 is so positioned with respect to the arcuate clutch member 184 that this latter member is normally maintained in such a position that the tooth 185 thereof remains out of the path of movement of the teeth 177 formed on the continuously rotating member 176. However, when the latch member 190 is depressed, the arcuate member 184 under the influence of the spring 186 moves inwardly, thus allowing the tooth 185 thereof to become positioned in the path of an oncoming tooth 177 so that when these two teeth become engaged the arcuate member 184, together with the carriage return cam 180 on which it is mounted, will make a complete revolution. At some point during the revolution of the cam member 180, the elongated latch bar 190 will be restored to its normal elevated position so that the downwardly turned portion 189 of the arcuate member 184 may again engage the elongated latch member 190 and terminate revolution of the cam 180.

Referring now to Figs. 1, 2, 3, 10 and 11, a cam follower 200 is pivoted on a stud 202 carried on the side plate 32. This member is shown in detail in Fig. 11 and carries at its lower end a cam roller 204 designed for cooperation with the carriage return cam 180. The follower 200 has attached thereto one end of a spring 206, the other end of the spring being secured to a stationary bracket 208 which in turn is secured as at 209 to the side plate 32. The spring 206 serves to bias the follower 200 in a counterclockwise direction, as viewed in Fig. 10, in such a manner that the cam roller 204 bears against the periphery of the carriage return cam 180. The cam follower 200 is provided with a generally arcuate serrated edge 210 designed for cooperation with a square stud 212 to effect carriage return operations in a manner that will become clear presently. The square stud 212 is carried at the free end of a creeper link 214 of irregular contour and having an extension 216 formed thereon provided with an arcuate slot 218 therein. A stud 220 carried on the bracket 208 projects through the slot 218 and thus confines the creeper link 214 in its movements. The creeper link 214 is provided with a second extension 222 having an attachment hook 224 formed at its outer end. The attachment hook 224 is connected by means of a tie rod 226 (Fig. 2) to one end of a rocker arm or pitman 228 which is secured medially of its ends as at 230 to a stationary bracket 232 secured in any suitable manner (not shown) to a portion of the framework of the machine 14. A second tie rod 234 is connected to the other end of the pitman 228 and is also connected to the movable carriage 17 of the embossing machine.

The arrangement of parts just described is for the purpose of effecting return of the carriage 17 to its initial position after a line of embossing has been completed on one of the plates P undergoing embossing in the machine 14. Carriage return operations commence whenever the carriage return code perforations on the tape T arrive at the sensing station 18. At this time an electrical circuit is completed to the proper magnets 130 so that the permutation bars 90 are actuated to permit the carriage return seeker lever 68 (so labeled) to move forwardly and be engaged by the actuating bail 56. When this occurs, the tie rod 196 causes the latch bar 190 to be depressed in the manner previously described and trip the one-revolution clutch 178. The contour of the cam 180 is such that it is possessed of a low region and a high region, as is apparent from an inspection of Fig. 10. When the clutch is first tripped, the cam roller 204 rides outwardly onto the high region of the cam 180, thus tilting the cam follower 200 in a clockwise direction, as viewed in this latter figure, and drawing the square shaft 212 to the right a distance commensurate with its elevation along the serrated portion of the cam follower. During step-by-step embossing operations the carriage 17 of the embossing machine 14 is stepped or indexed along the guide rods 19 to the right much in the manner of the indexing of an ordinary typewriting machine carriage. As the carriage progresses step-by-step to the right the pitman arm 228 is periodically indexed in a clockwise direction, as viewed in Fig. 2, thus drawing the hooked portion 224 of the creeper link 214 to the left, as viewed in Figs. 2 and 10. This initiates a step-by-step movement of the creeper link as it pivots about the axis of the stud 220 which occupies a position on the center of the arcuate serrated edge 210 of the cam follower 200. The creeper link thus moves in such a manner that the square stud 212 creeps upwardly along the serrated edge 210 of the cam follower. If the carriage 17 is indexed to the full extent of which it is capable at the end of its stroke, the square stud 212 will have traversed the entire length of the serrated portion 210 and will come to rest near the top of the cam follower 200. If then, at this time, a carriage return code on the tape T is encountered at the sensing station 18, the cam 180 will go into effect by virtue of the release of the one-revolution clutch 178, and the square stud 212 will be pulled forwardly at a comparatively high rate of speed, thus restoring the carriage to its initial position with a simple harmonic motion which is of a decelerating nature and of large amplitude. If, one the other hand, carriage return functions are instituted while the square stud 212 is at an intermediate point along the serrated edge 210 of the cam follower 200, a similar mechanical carriage return function will take place and the carriage will be returned to its initial position at a lesser but still decelerating rate of speed. In this manner, the carriage is prevented from forcibly striking the carriage stop and the former is thus effectively protected against damage. Once the carriage has been returned and the cam roller 204 has again returned to the low portion of the cam 180, the cam follower 200 is restored to its initial position and immediately upon counter-clockwise movement of this follower the creeper link 214 falls by gravity to its initial position and the parts are restored to the positions in which they are shown in Fig. 10. During this latter movement of the creeper link 214, the slotted portion 218 thereof slides forwardly on the stud 220.

It is to be noted that due to the fact that the number of teeth on the pinion 172 is twice the number of teeth on the pinion 170, thus creating a 2:1 gear reduction, two cycles of operation of the tape reading unit 10 are required to return the carriage from any intermediate position to its initial position. A carriage return code perforation in the tape T is always followed by a line feed code which through the line feed seeker lever 68 (so labeled) depresses the line feed lever 13 of the keyboard 15. As a safety measure to prevent movement of the carriage while the plate is being embossed, which may happen due to failure or to improperly punched tape, a pair of normally closed contacts CP are adapted to be opened by forward movement of the carriage return seeker lever 68. Toward this end, a contact assembly designated in its entirety at 236 and including the contacts CP is secured to the side plate 34. A finger 238 mounted on the extension 78 of the seeker lever 68 carries a cam piece 240 designed for cooperation with a similar cam piece 242 associated with the contacts CP, the cam pieces being so arranged that forward movement of the seeker lever 68 will open the contacts CP and rearward movement of this seeker lever will permit closing of the same.

In Fig. 12 the circuit diagram for the permutation magnets 130 has been illustrated. These magnets in addition to their group designation have been labeled *a*, *b*, *c*, *d* and *e* to correspond to the code bars whose movements they control. At the sensing station 18 there is provided a contact roll shaft diagrammatically shown at 31 and having insulated contact sleeves 33 mounted thereon each designed for electrical cooperation with respective sensing brushes *a'*, *b'*, *c'*, *d'* and *e'* and between which contact sleeves and sensing brushes the tape T is adapted to pass. The perforations in the tape are adapted to be sensed in the respective columns thereof as the tape passes through the sensing station and current issuing from one side of the line will, whenever one or more perforations is encountered, flow through the corresponding sensing brush or brushes to its respective contact roll or rolls and from thence through one or more of the magnets 130 and will then proceed through the contacts CP to the other side of the line. Obviously, when the contacts CP are opened by virtue of the carriage return seeker lever 68 having been moved to its advanced position as previously described, sensing operations will be discontinued until such time as this lever is restored to its normal position.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. The combination with the keyboard of a printing machine or the like having a movable carriage operable upon depression of the print keys thereof to become indexed subsequent to the printing operation, of a control mechanism for operating said keys including a vertically reciprocable actuating bail, a supporting member for the said bail, means for continuously reciprocating said bail, a plurality of depressible seeker levers, means operatively connecting each seeker lever to a respective print key, said seeker levers being movable from elevated positions to lowered positions during which movement they serve to depress their respective keys, said levers also being movable from retracted positions wherein they are out of the path of movement of said bail to advanced positions wherein they are projected into the path of movement of said bail for engagement and depression thereby, means normally urging said levers to their advanced positions, a plurality of shiftable permutation bars common to said levers and normally maintaining the latter in their retracted positions, a restoring bail mounted on said supporting member and having a horizontal component of movement upon oscillation of said supporting member, means on each of said seeker levers positioned in the path of movement of said restoring bail when said lever is in its advanced position for engagement by said latter bail to restore said lever to its retracted position, and record controlled means for selectively shifting said bars to permit selective movement of said levers to their advanced positions.

2. The combination with the keyboard of a printing machine or the like having a movable carriage operable upon depression of the print keys thereof to become indexed subsequent to the printing operation, of a control mechanism for operating said keys including a continuously rotatable horizontal shaft, a bail cam disposed on said shaft, a bail supporting member mounted for oscillation about a horizontal axis, a cam follower on said bail supporting member, means normally urging said follower into engagement with said bail cam whereby rotation of the latter will cause oscillation of the bail supporting member, an actuating bail mounted on said bail supporting member and having a vertical component of motion, a restoring bail on said member and having a horizontal component of motion, a plurality of depressible seeker levers, means operatively connecting each lever to a respective print key, said levers being movable from elevated positions to lowered positions during which movement they serve to depress their respective keys, said levers also being movable from retracted positions wherein they are out of the path of movement of said actuating bail to advanced positions wherein they are projected into said path for engagement with and depression by said latter bail, means normally urging said levers to their advanced positions, a plurality of shiftable permutation bars common to said levers and normally maintaining the latter in their retracted positions, an abutment on each lever positioned in the path of movement of said restoring bail when said lever is in its advanced position for engagement by said restoring bail to restore the lever, and record controlled means for selectively shifting said bars to permit selective movement of said levers to their advanced positions.

3. The combination with the keyboard of a printing machine or the like having a movable carriage operable upon depression of the print keys thereof to become indexed subsequent to the printing operation, of a control mechanism for operating said keys including a shaft mounted for rotation about a horizontal axis beneath said print keys, a bail cam mounted on said shaft and rotatable therewith, a bail supporting yoke mounted for oscillation about an axis substantially parallel to the axis of said shaft and having a generally forwardly extending arm and a generally upwardly extending arm, a plurality of depressible seeker levers, an actuating bail common to said levers carried by said forwardly extending arm, a restoring bail common to said levers carried by said upwardly extending arm, means operatively connecting each seeker lever to a respective print key, said seeker levers being movable from elevated positions to lowered positions during which movement they serve to depress their respective keys, said levers also being movable from retracted positions wherein they are out of the path of movement of said actuating bail to advanced positions wherein they are projected into the path of movement of said latter bail for engagement and depression thereby, means normally urging said levers to their advanced positions, a plurality of shiftable permutation bars common to said levers and normally maintaining the latter in their retracted positions, an abutment on each of said seeker levers positioned in the path of movement of said restoring bail when said lever is in its advanced position for engagement by said restoring bail to restore the lever to its retracted position, and record controlled means for selectively shifting said bars to permit selective movement of said levers to their advanced positions.

4. The combination with the keyboard of a printing machine or the like having a movable carriage operable upon depression of the print keys thereof to become indexed subsequent to the printing operation, of a control mechanism for operating said keys including a vertically reciprocable actuating bail, means for continuously reciprocating said bail, a stationary horizontal guide rod, a plurality of depressible seeker levers, each lever including a bifurcated extension, the furcations of which straddle said guide rod, and a forwardly extending arm provided with a shoulder adjacent its free end, means operatively connecting each lever to a respective print key, said guide rod and bifurcated extensions constituting sliding pivots for the levers whereby the same are movable from elevated positions to lowered positions during which movement they serve to depress their respective keys, said levers being movable horizontally from retracted positions wherein they are out of the path of movement of said bail to advanced positions wherein the shoulders thereon are projected into the path of movement of said bail for engagement and depression of the levers thereby, means normally urging each lever to its advanced position, and record controlled selective permutation means for permitting movement of said levers from their retracted to their advanced positions.

5. The combination with the keyboard of a metal plate-embossing machine, the keyboard having numeric and alphabetic embossing keys, of a control mechanism for operating said keys including a depressible seeker lever for each key, an actuating bail movable from an elevated position to a lowered position, said levers being shiftable from retracted positions out of the path of movement of said bail to advanced positions wherein they are projected into the path of said bail for engagement by the latter to cause depression thereof, means normally urging said levers to their advanced positions, and a plurality of permutation bars normally maintaining said levers in their retracted positions but operable upon selective shifting thereof to select an individual lever for movement to its advanced position, said permutation bars including a series of code bars having voids and solid areas cooperating with said levers to select either an alphabetic or a numeric key for depression or jointly an alphabetic and numeric key for depression, said permutation bars also including a shift bar, the latter also having voids and solid areas cooperating with the voids and solid areas of the other bars ot prevent selection of an alphabetic key in one position of the shift bar and to prevent selection of a numeric key in another position of said bar, and record controlled means for shifting the positions of said permutation bars.

6. The combination with the keyboard of a metal plate-embossing machine, the keyboard having numeric and alphabetic embossing keys, of a control mechanism for operating said keys including a depressible seeker lever for each key, an actuating bail movable from an elevated position to a lowered position, said levers being shiftable from retracted positions out of the path of movement of said bail to advanced positions wherein they are projected into the path of said bail for engagement by the latter to cause depression thereof, means normally urging said levers to their advanced positions, and a plurality of permutation bars normally maintaining said levers in their retracted positions but operable upon selective shifting thereof to select an individual lever for movement to its advanced position, said permutation bars including a series of code bars having voids and solid areas cooperating with said levers to select either an alphabetic or a numeric key for depression or jointly an alphabetic and numeric key for depression, said permutation bars also including a shift bar, the latter also having voids and solid areas cooperating with the voids and solid areas of the other bars to prevent selection of an alphabetic key in one position of the shift bar and to prevent selection of a numeric key in another position of said bar, said control mechanism including an additional pair of seeker levers cooperating with said permutation bars, said latter levers each being operable upon depression thereof to move said shift bar from one position to the other, and record controlled means for shifting the positions of said permutation bars.

7. The combination with the keyboard of a metal plate-embossing machine, the keyboard having numeric and alphabetic embossing keys, of a control mechanism for operating said keys including a depressible seeker lever for each key, an actuating bail movable from an elevated position to a lowered position, said levers being shiftable from retracted positions out of the path of movement of said bail to advanced positions wherein they are projected into the path of said bail for engagement by the latter to cause depression thereof, means normally urging said levers to their advanced positions, and a plurality of permutation bars normally maintaining said levers in their retracted positions but operable upon selective shifting thereof to select an individual lever for movement to its advanced position, said permutation bars including a series of code bars having voids and solid areas cooperating with said levers to select either an alphabetic or a numeric key for depression or jointly an alphabetic and numeric key for depression, said permutation bars also including a shift bar, the latter also having voids and solid areas cooperating with the voids and solid areas of the other bars to prevent selection of an alphabetic key in one position of the shift bar and to prevent selection of a numeric key in another position of said bar, said control mechanism including an additional pair of seeker levers cooperating with said permutation bars, said latter levers each being operable upon depression thereof to move said shift bar from one position to the other, and record controlled means for shifting the positions of said permutation bars, the solid areas and voids of all of said permutation bars, including the shift bar, cooperating to permit projection of said additional levers in either position of the shift bar.

CLYDE J. FITCH.

REFERENCES CITED

The following references are of record in the file of this patent:

UNITED STATES PATENTS

| Number | Name | Date |
|---|---|---|
| 1,292,944 | Wright | Jan. 28, 1919 |
| 1,399,365 | Pillings | Dec. 6, 1921 |
| 1,606,126 | Houston | Nov. 9, 1926 |
| 1,975,791 | Hopkins | Oct. 9, 1934 |
| 2,066,978 | Koca | Jan. 5, 1937 |